W. A. P. La GROVE.
AUTOMATIC TOY-DANCER.
No. 6,875. Reissued Jan. 25, 1876.
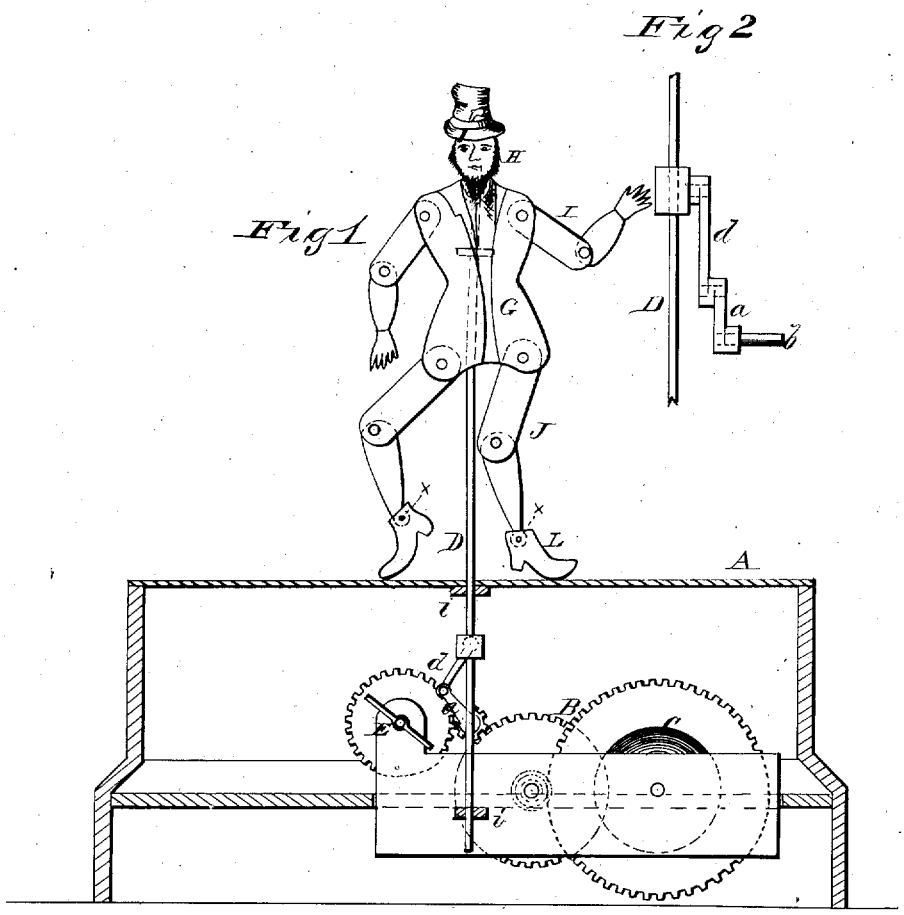
WITNESSES
Franck L. Durand
C. L. Ewert
By
INVENTOR
Wm A. P. La Grove
Alexander Mason
Attorneys

UNITED STATES PATENT OFFICE.

WILLIAM A. P. LA GROVE, OF BROOKLYN, NEW YORK, ASSIGNOR, BY MESNE ASSIGNMENTS, TO IVES, BLAKESLEE & CO., OF BRIDGEPORT, CONN.

IMPROVEMENT IN AUTOMATIC TOY DANCERS.

Specification forming part of Letters Patent No. 143,082, dated September 23, 1873; reissue No. 6,875, dated January 25, 1876; application filed January 7, 1876.

*To all whom it may concern:*

Be it known that I, WILLIAM A. P. LA GROVE, of Brooklyn, in the county of Kings and State of New York, have invented certain new and useful Improvements in Automatic Toy Dancers; and I do hereby declare that the following is a full, clear, and exact description thereof, references being had to the accompanying drawings, and to the letters of reference marked thereon, which form a part of this specification.

The nature of my invention consists, first, in a toy dancer, mounted upon a vertically reciprocating and guided rod or wire; second, in a toy dancer having its legs hinged to the body, and mounted upon a vertically-reciprocating rod, which is actuated by a spring and gearing; third, in a toy dancing-figure having its legs hinged to its body, and having its feet hinged to its legs, and mounted upon a vertically-reciprocating rod or wire; fourth, in constructing the foot of a toy dancing-figure with a mortise or slot above its heel, and connecting the same to the leg of the figure by a cross-piece passing through the foot and lower end of the leg; fifth, in the combination of a clock-gearing inclosed within a box or case, one or more vertical rods or wires connected to the gearing, and extended through the top of the case, and one or more removable and hinged toy dancing-figures mounted on said rods; sixth, in the combination, with a jointed dancing-figure, of a vertical wire reciprocated in guides by a connecting-rod, crank, shaft, and gearing, all as hereinafter more fully set forth.

In order to enable others skilled in the art to which my invention appertains to make and use the same, I will now proceed to describe its construction and operation, referring to the annexed drawing, in which—

Figure 1 is a vertical section of the base upon which the figure stands, showing one such figure and the actuating mechanism. Fig. 2 is a detached view of the crank and connecting-rod.

A represents a box or case of any suitable size and shape, and made more or less ornamental, forming the base of the toy. Within this box or case is an ordinary clock-gearing, B, operated by a spring, C.

E is the regulating-fly of the clock-work, and *a* is a crank on the end of a shaft, *b*, operated by the gearing B. From the crank *a* a connecting-rod, *d*, passes to a pin that extends to a vertical rod or wire, D. This rod or wire passes through guides *i i* above and below the crank, so that said rod or wire will have a vertically-reciprocating motion by the action of the crank and gearing.

The joint between the connecting-rod *d* and the spring-wire D is not closely fitted, so that the swinging of said rod or link *d*, and the action of the crank thereupon, will tend to give a slight rotary movement—first one way and then the other—to the wire D and the figure placed thereon.

The dancing-figure consists of a body, G, with head H, in one or two pieces, having a hole from the lower end upward for a suitable distance, so as to be placed upon the upper end of the wire D. To the body G are hinged arms I I, which may be jointed at the elbows, or not, as desired. To the body G are also hinged legs J J, which may also be jointed at the knees or not, as desired. L L represent the feet of the figure, which have each a mortise or slot above its heel, and is connected to the leg by a cross-pin, *x*, passing through the foot and the lower end of the leg.

In operation the toy figure is carried up and down by the movement of the crank, and also turns to the right and left by the slight rotary movement imparted to the wire D, the limbs of the figure moving and swinging during the dancing.

Having thus fully described my invention, what I claim as new, and desire to secure by Letters Patent, is—

1. A toy dancer, mounted upon a vertically reciprocating and guided rod or wire, and operated by gearing and spring inclosed within a box or case, substantially as set forth.

2. A toy dancer, having its legs hinged to its body, and mounted upon a vertically-reciprocating rod actuated by mechanism inclosed within a case or box, whereby the feet of the dancer intermittingly strike the top of the case, and make a noise in imitation of a jig-dancer, substantially as herein set forth.

3. A toy dancer, having its legs hinged to the body, and mounted upon a vertically-reciprocating rod actuated by a spring and gearing, substantially as set forth.

4. A toy dancing-figure, having its legs hinged to its body, and having its feet hinged to its legs, and mounted upon a vertically-reciprocating rod or wire, substantially as set forth.

5. The foot L of a toy dancing-figure, having a mortise or slot above its heel, and connected to the leg of the figure by a cross-pin passing through the foot and lower end of the leg, substantially as herein set forth.

6. The combination of a clock-gearing inclosed within a box or case, one or more vertical rods or wires connected to the gearing, and extended through the top of the case, and one or more removable and hinged toy dancing-figures mounted on said rods, all substantially as herein set forth.

7. In combination with the jointed dancing-figure, the vertical wire D, reciprocated in the guides *i*, by the connecting-rod *d*, crank *a*, shaft, and gearing, substantially as described.

In testimony that I claim the foregoing I have hereunto set my hand this 16th day of December, 1875.

W. A. P. LA GROVE.

Witnesses:
C. L. EVERT,
W. A. MCARTHUR.